United States Patent [19]

Tai

[11] 4,038,318
[45] July 26, 1977

[54] IONENES

[75] Inventor: Wun Ten Tai, Palos Hills, Ill.

[73] Assignee: Nalco Chemical Company, Oak Brook, Ill.

[21] Appl. No.: 590,882

[22] Filed: June 27, 1975

[51] Int. Cl.$^2$ ............................................. C07C 91/38
[52] U.S. Cl. ............................ 260/567.6 P; 260/570.6; 252/344
[58] Field of Search .............. 260/567.6 P, 51.5, 59 R, 260/52 R, 2 R, 570.6

[56] References Cited

U.S. PATENT DOCUMENTS

| | | | |
|---|---|---|---|
| 3,436,373 | 4/1969 | Cox et al. | 260/51.5 |
| 3,790,606 | 2/1974 | Sillet | 260/567.6 P |
| 3,870,670 | 3/1975 | Hofel et al. | 260/57 R |

FOREIGN PATENT DOCUMENTS

| | | | |
|---|---|---|---|
| 1,002,272 | 8/1965 | United Kingdom | 260/51.5 |

OTHER PUBLICATIONS

Blicke et al., J. Chem. Soc., vol. 24, pp. 1061–1068, (1959).

Primary Examiner—James O. Thomas, Jr.
Assistant Examiner—James H. Reamer
Attorney, Agent, or Firm—John G. Premo; Robert A. Miller; Barry W. Sufrin

[57] ABSTRACT

Novel ionene polymers are formed by the mannich reaction of an aromatic molecule having an electron withdrawing group with a lower aliphatic aldehyde and a lower aliphatic secondary amine followed by polymerizing the manniched derivative by the use of chain extenders from the group of di-functional condensation monomers consisting of alkyl dihalides, epihalohydrins and 1,4-dihalobutene-2. Additionally, the polymers may be prepared by substituting some or all of the secondary amines above with a primary amine, and quaternizing the resultant polymers formed.

The product of this invention have present utility as polymers useful for water clarification and as emulsion breakers for water-in-oil or oil-in-water emulsions.

7 Claims, No Drawings

IONENES

INTRODUCTION

The present invention relates to the production of novel ionene resins or polymers having as a primary constituent an aromatic molecule wherein a positively charged active nitrogen site on a portion or portions of this molecule is produced by a mannich type reaction using a secondary amine and an aldehyde or by condensation using a primary amine and an aldehyde. In general, the polymers may be produced from the following reactants: phenols; lower aliphatic aldehydes; lower aliphatic secondary amines; and chain extenders.

THE PHENOLS

The phenols or aromatic molecules which I use in my invention are substituted benzene rings having at least one electron withdrawing group attached. Examples of compounds of this nature include phenol, and ortho, meta and para substituted alkyl phenols. Examples of these types of materials include but are in no ways limited to t-butyl phenol, o-methyl phenol, and m-methyl phenol, and nonyl phenol. The alkyl substituent may be any number of a variety of alkyl groups. Generally, I prefer to use those which are not overly bulky, and thus prefer to limit the substituents to 15 carbons or less. Additionally, the phenol type material that I may use in my invention may be di or tri substituted by alkyl groups. When the phenol type material is alkyl substituted, it is important that at least two remaining active positions be left on the molecule. It is thus important that at least two positions be left open, either at the ortho and/or para positions. I have found that in the practice of my invention that when using trisubstituted alkyl phenol with only the meta positions remaining open (nonsubstituted), it is extremely difficult to achieve a reaction and obtain the ionene polymers.

Rather than using phenol or an alkyl substituted phenol, my invention will also perform satisfactory with nitrates, cyanates, aldehydes or carboxylic acid functional groups in place of the hydroxyl group. In these cases the corresponding derivatives may also be substituted if desired with alkyl groups as described above.

The aldehydes which I prefer to use in the practice of my invention are those which contain from 1 to 3 carbon atoms. These lower aliphatic materials are reacted with a lower aliphatic primary or secondary amine and this adduct is then reacted with the aromatic base molecule. Examples of preferred aldehydes include formaldehyde, acetaldehyde and propionaldehyde. Due to the commercial availability and reactivity of formaldehyde, it is my preferred aldehyde.

The lower aliphatic secondary amines useful in the practice of my invention include those containing from 2 to 6 carbon atoms. Included in this group are dimethylamine, diethylamine, dipropylamine, methylethylamine, methylpropylamine and ethylpropylamine. Again due to commercial availability and cost I prefer to use dimethylamine and it is the preferred secondary amine in the practice of my invention.

In addition to the molecules listed above, a lower aliphatic primary amine may be substituted for some or all of the secondary amine employed. If this is done, ideally the resultant molecule should later be quaternized with well known materials such as methyl-chloride so as to improve the cationicity of the resultant product. The primary amines which may be used may contain from 1 to 4 carbon atoms with most preferred primary amine being methylamine.

The chain extenders which I use in the course of my invention include but are not limited to 1,4-dihalobutene-2, and epihalohydrins. These compounds will react with the nitrogen group of the amine-aldehyde adduct after it is joined to the aromatic molecule and will join two moles of the manniched aromatic molecule together for each mole of chain extender employed. Additionally, a lower aliphatic diamine, preferably ethylene diamine may also be utilized in conjunction with the above chain extenders, with one mole of diamine being used to join two moles of chain extender. Thus, the lower aliphatic diamine may be used in quantities ranging from 0 up to 0.5 mole of diamine per mole of chain extender.

Suitable chain extenders include 1,4-dichlorobutene-2 and epichlorohydrin. However, any halogen containing difunctional monomer which will undergo condensation polymerization will perform as a chain extender. Examples of these molecules include 1,3-dichloropropane and ethylenedichloride. When a diamine is used to further extend the chain length between substituted phenol groups, it is necessary to use two moles of the chain extender for each mole of the diamine employed. This enables a condensation polymer to be formed between the diamine, the chain extender, and the mannich phenol derivative. The use of the diamine will also add additional amine functionality to the polymer which may or may not be quaternized if desired.

In the above product with the use of a secondary amine, a cationic ionene polymer is produced. In the second series of products or polymers envisaged by this invention, where a primary amine is utilized, the reaction products are polytertiary amines which may be quaternized by reaction with an alkyl halide such as methylbromide or methylchloride, and in the case of the analogous reaction above utilizing a primary amine, the product trisdimethylaminomethylphenol functions as a bistertiaryamine because of the internal salt formation between the phenolic OH group and one of the orthodialkylaminoalkyl groups. In this case these polytertiary amines may be quaternized to an ionene.

The first step in the preparation of the ionenes of the present invention is the reaction of a secondary (or primary) amine; a lower aliphatic aldehyde; and a phenol or alkyl substituted phenol. This is accomplished by either adding the lower aliphatic aldehyde or the amine to the phenol followed by the amine or aldehyde, or in the alternative reacting the lower aliphatic aldehyde with the secondary or primary amine and adding this mixture to the phenol. This reaction proceeds by the well known aromatic substitution rules and the "mannich" derivative so formed will add to the phenol in accordance with these rules. This derivative is then joined together by the use of the chain extenders reacting with the teritary nitrogen (in the case of a secondary amine) or secondary nitrogen (in the case of a primary amine) so as to join two moles of the manniched phenol derivative together for each two moles of chain extender employed. Illustrative of this, but not limited to is the following reaction scheme using as the reactants phenol, dimethylamine, formaldehyde, and 1,4-dichlorobutene-2 to form the ionenes of the present invention:

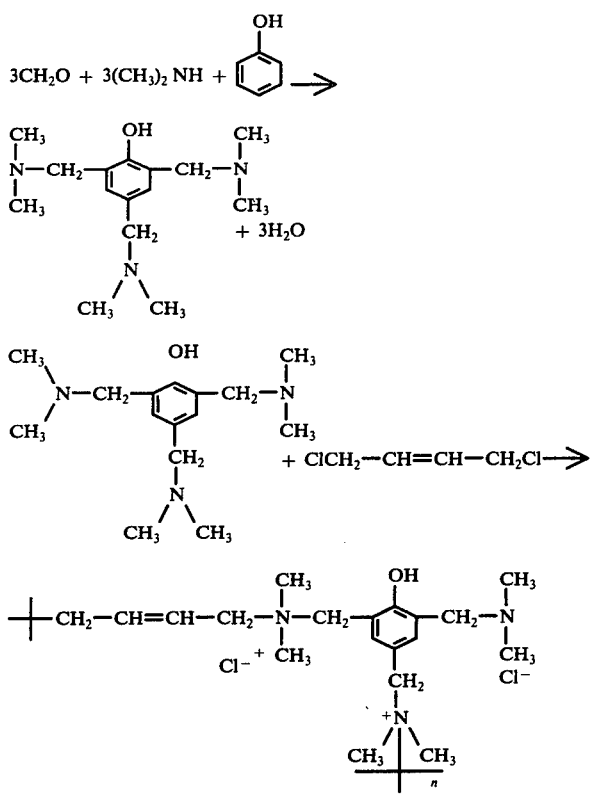

wherein n is a positive integer greater than about 5.

As seen from the formula, three moles of the secondary amine-aldehyde premix are necessary for a nonsubstituted phenol with only one mole of the chain extender necessary. The mole ratios of these reactants will differ depending on the substitution of the phenol derivative and the particular substituent employed. As an example, while the above reactants using a nonsubstituted phenol reacted in a mole ratio of 1:3:3:1; aromatic molecule to aldehyde to secondary amine to chain extender with a parasubstituted alkyl phenol, the respective mole ratios will be 1:2:2:1 due to the fact that the substituents will only attack on the ortho positions to the hydroxyl group. With a meta substituted alkyl phenol, again the reactants will be in a ratio of 1:3:3:1 since the ring will be substituted at both of the ortho positions as well as the para positions. With an ortho substituted alkyl phenol, the mole ratios of the necessary reactants will be 1:2:2:1 since the substituents will attack the remaining ortho as well as the para position.

As seen, molar ratios of lower aliphatic amine to the ratios of the lower aliphatic aldehyde preferably should be about 1.0, with the molar ratio of the phenol or alkyl substituted phenol and the chain extender also being about 1. It will also be seen that in order to form the ionene polymers of my invention, the molar ratios of $$\frac{(amine + aldehyde)}{(phenol + chain\ extender)} = \frac{A + D}{C + D}$$

must be at least 2.0.

With di or tri substituted alkyl phenols or with the use of other electron withdrawing groups replacing the hydroxyl the addition of the premix will be done according to the aromatic substitution rules which should be well known to those skilled in the art and will not be belabored here.

As stated above, the ionenes of my invention are prepared by reacting a lower aliphatic aldehyde, a secondary amine, and an aromatic molecule having substituted thereon an electron withdrawing group together and then reacting this with a chain extender. The aldehyde-secondary amine premixes which may be used in my invention are typically prepared by mixing together an aqueous solution containing an aldehyde with a secondary amine. This reaction may take place at ambient temperature, or may be performed at elevated temperatures, however the reaction proceeds at a very rapid rate at ambient temperature. The preferred secondary amine is dimethylamine, and the preferred aldehyde is formaldehyde. The molar ratio of the aldehyde to the secondary amine may vary over a wide range, with the preferred mole ratio being in the range of 2:1 to 1:2. The most preferred molar ratio of amine to aldehyde is 1:1. However, it is oftentimes advisable to have a very slight molar excess of the amine present when making this premix so as to tie up unreacted formaldehyde so as to prevent cross linking of the polymer at later steps. The premix should be made in as high a concentration as possible so as to avoid dilution of the end product during subsequent steps. Typically the adducts range from 0.1 to 55% by weight in solution.

Once the N,N-dialkylamino alkyl alcohol adduct is obtained, the phenol, phenol derivative or other aromatic containing an electron withdrawing group to be employed is added to it in the specific mole ratios listed above and the reactants stirred at temperatures of from 10° to 100° C for a sufficient length of time to carry out the mannich reaction. Oftentimes, the reaction will be complete within a relatively short period of time and I have found that for most practical purposes that within 5 hours this step of the reaction is complete.

In the alternative rather than using a premix, the lower aliphatic aldehyde may be added directly to the phenol or substituted phenol compound followed by adding the primary or secondary amine to this mixture. This is done in the same mole ratios and under basically the same conditions as discussed above and produces an identical product to those products obtained using the premix.

At this point the product is heated to a temperature of from 20° to 70° C and the chain extending compound is added slowly so as to maintain the temperature selected. The chain extender is added in a molar ratio equivalent to that of the starting aromatic base molecule employed. After a suitable length of time, the reaction is cooled if desired, and the resultant ionene polymer is collected. Occasionally, it will be necessary to use a water soluble organic solvent for solubility purposes. If this is necessary, the solvent used should be added in a quantity so as to regulate the solubility of the material and should be used sparingly so as to maintain a concentrated product. A solvent which I have found particularly useful in this step is isopropanol although other water soluble organic solvents which are unreactive will perform adequately.

Furthermore, it is sometimes necessary to place the organic water miscible solvent in with the aromatic molecule for the mannich reaction itself. This is due to the solubility of the aromatic base molecule employed, so as to increase the ease of handling of this material, and the elimination of a two layered system for this step.

If during the mannich reaction, a primary amine is used rather than the secondary amine or if a diamine type chain extender has been used with the preferred chain extenders it will oftentimes be advantageous although not necessary to quaternize the resulting product. This can be done with any number of well known quaternization agents including methylchloride, ethylchloride, methylsulfate, and other commercially available well known materials. Those skilled in the art will readily see that the quaternization step will add cationicity to the resulting product and will enable it to perform more satisfactorily as a cationic polymer at alkaline pH values.

The polymers produced in accordance with my invention are characterized by their low intrinsic viscosity in the range of 0.05-0.7 and a preferred range of 0.08-0.19 and a low charge density having a maximum value of 3/20. The latter value is compared with a value for polymers of dimethylamine and epichlorohydrin of 1/7.

The products of this invention have present utility as polymers useful for water clarification and as emulsion breakers for water-in-oil or oil-in-water emulsions.

In order to better illustrate my invention the following examples are presented:

EXAMPLE 1

90.0 grams (2.0 moles) of dimethylamine gas was bubbled through a stirred aqueous formaldehyde solution (161.7 grams (0.20 moles) 37.1%) at a temperature of from 10° to 30° C with external cooling over a period of 2.0 hours. 150.2 grams of p-t-butyl phenol (1.0 mole) was added and the mixture was stirred at 22° to 48° C for 2 hours followed by heating to reflux at 90° C for 4 hours. The resultant material had 2 layers which were separated. The oily layer weighing 214 grams was removed.

EXAMPLE 2

82.9 grams (.40 moles) of the oily layer of Example 1 was placed into a 500 milliliter resin flask without further drying and was heated to 45°. 50.0 grams of 1,4-dichlorobutene-2 (0.40 moles) was then added slowly over a period of 30 minutes while maintaining temperature. The mixture was held at this temperature for an additional hour at which time the viscous product was removed from the flask. The polymer obtained exhibited an intrinsic viscosity of 0.13 and a Huggins constant of .94.

EXAMPLE 3

40.0 grams (.1515 moles) of the material produced in Example 1 was added to a 500 milliliter resin flask along with 60.0 grams of isopropanol alcohol. This mixture was stirred at room temperature, and 18.94 grams (.1515 moles) of 1,4-dichlorobutene-2 was added slowly over a period of 2 hours and 21 minutes at temperatures of from 21° to 47° C until the pH of the reaction mixture had decreased to approximately 7.0. The polymer produced by this method had an intrinsic viscosity of .07 in a Huggins constant of 0.91.

EXAMPLE 4

Dimethylamine gas, (90 grams) was bubbled through a stirred aqueous formaldehyde solution containing 161.7 grams of a 37.1% formaldehyde solution. This mixture had added to it 220 grams (1.0 moles) of para-nonylphenol. This mixture was heated at temperatures ranging from 22° to 95° C for 6 hours at which time the oily layer was separated and the resulting Bis(dimethylaminomethyl) p-nonylphenol was isolated. 35.8 grams of the manniched nonylphenol above was then added to a 250 milliliter round bottom flask along with 50.0 grams of isopropanol alcohol. This mixture had added to it 13.3 grams (.1065 moles) of 1,4-dichlorobutene-2 and the reaction was allowed to continue with heating at temperatures of 45° to 51° for approximately 2 hours. The resulting polymer solution containing 41.98% polymer had an intrinsic viscosity of 0.062 and a Huggins constant of .47.

EXAMPLE 5–12

Various runs of polymer were made by the method as generally described. The mole ratios of reactants, reaction conditions and analytical results including intrinsic viscosity and percent cationicity at pH's 4 and 8 as determined by colbid titration are found on Table I. The products formed in Example 5 through 12 were tested in water clarification against a commercially available quaternized ethylenedichloride-ammonia polymer and against the same polymer in the resolution of oil-in-water emulsions of waste oil, with the results presented in Table II. The replacement ratios given are the grams of active material necessary to replace 1.0 gram of a commercially available polymer discussed above.

TABLE I

Phenol-Formaldehyde-Dimethylamine-trans-1,4-Dichlorobutene-2 (Phenol-Ch$_2$O-DMA-DCB)

| Ex. | | Initial (wt %) Reactant Conc. | T °C | T min. | Polymer Backbone without Cl$^-$ % + Charge pH 4 | pH 8 | $\eta_I$ | H | $\eta_I$ with Cl$^-$ |
|---|---|---|---|---|---|---|---|---|---|
| 5 | Phenol, CH$_2$O, DMA, DCB (1:3:3:1) | 68.8 | 33–59 | 65 | 102 | 81 | 0.108 | 0.68 | 0.089 |
| 6 | Phenol, CH$_2$O, DMA, DCB (1:3:3:1) | 22.0 | 22–34 | 67 | 104 | 72 | 0.086 | 0.73 | 0.071 |
| 7 | Phenol, CH$_2$O, DMA, DCB (1:3:3:1) | 23.4 | 50 | 10 | 108 | 89 | 0.077 | 1.4 | 0.063 |
| 8 | Phenol, CH$_2$O, DMA, DCB (1:3:3:1.4) EDA (0.2) | 42.3 | 25–30 | 34 | 102 | 75 | 0.075 | 1.4 | 0.058 |
| 9 | Phenol, CH$_2$O, DMA, DCB (1:3:3:1) | 65.0 | 45–50 | 93 | 108 | 91 | 0.28 | 1.6 | 0.23 |
| 10 | Phenol, CH$_2$O, DMA, DCB (1:3:3:1) | 36.3 | 75–37 | 180 | 111 | 85 | 0.21 | 2.2 | 0.17 |
| 11 | Phenol, CH$_2$O, DMA, DCB (1:3:3:1.1) | 18.6 | 45–55 | 208 | 130 | 119 | 0.17 | 1.5 | 0.14 |
| 12 | Phenol, CH$_2$O, DMA, DCB (1:3:3:1.4) | 19.1 | 34–53 | 72 | 115 | 92 | 0.13 | 6.3 particles in solution | 0.10 |

$\eta_I$ = Intrinsic Viscosity
H = Huggins Constant
% + charge = % Cationic Charge as CH$_2$O = Formaldehyde
DMA = Dimethylamine
DCB = 1,4-dichlorobutene-2

TABLE I-continued

Phenol-Formaldehyde-Dimethylamine-trans-1,4-Dichlorobutene-2 (Phenol-Ch₂O-DMA-DCB)

| Ex. | Initial (wt %) Reactant Conc. | T ° C | T min. | Polymer Backbone without Cl⁻ % + Charge pH 4 | pH 8 | $\eta_I$ | H | $\eta_I$ with Cl⁻ |
|---|---|---|---|---|---|---|---|---|
| | determined by colloid titration | | EDA = Ethylenediamine | | | | | |

TABLE II

| EXAMPLE | REPLACEMENT RATIO WATER CLARIFICATION | REPLACEMENT RATIO EMULSION BREAKING |
|---|---|---|
| 5 | .97 | — |
| 6 | 1.10 | — |
| 7 | .94 | — |
| 8 | 1.05 | — |
| 9 | 1.0 | — |
| 10 | .99 | — |
| 11 | .98 | — |
| 12 | .86 | .8 |

I claim:

1. A novel ionene polymer prepared by the steps comprising:
   A. Adding a lower aliphatic secondary amine containing 2-6 carbon atoms to a lower aliphatic aldehyde from the group consisting of formaldehyde and acetaldehyde in a mole ratio of from 2:1 to 1:2 to produce a secondary amine-aldehyde adduct,
   B. Adding the adduct of Step A to a phenol compound selected from the group consisting of phenol, and mono, di and tri alkyl substituted phenols said alkyl groups containing from 1-15 carbon atoms, said phenol compound further characterized as having at least two reactive sites in the ortho and-/or para position; in a mole ratio of aldehyde to phenol or substituted phenol of at least 2.0 with agitation at a temperature of from 10°-100° C for a period sufficient to allow a reaction; and then,
   C. Adding to the product of Step B a chain extender selected from the group consisting of 1,4-dichlorobutene-2 and epihalohydrins in a mole ratio of said phenol or substituted phenol to chain extender of essentially 1 with agitation at a temperature of from 20°-70° C for a time sufficient to form an ionene polymer,
   D. Recovering the ionene polymer.

2. The ionene polymer of claim 1 wherein in Step C a lower aliphatic diamine is added in a mole ratio of diamine to chain extender of up to 0.5:1.

3. The ionene polymer of claim 1 wherein the lower aliphatic secondary amine is dimethylamine.

4. The ionene polymer of claim 1 wherein the lower aliphatic aldehyde is formaldehyde.

5. The ionene polymer of claim 1 wherein the phenol compound is phenol.

6. The ionene polymer of claim 1 wherein the chain extender is 1,4-dichlorobutene-2.

7. The ionene polymer of claim 1 wherein the chain extender is epichlorohydrin.

* * * * *